V. R. KOONTZ.
TOOL HOLDER.
APPLICATION FILED JAN. 4, 1913.
1,080,565.
Patented Dec. 9, 1913.
2 SHEETS—SHEET 1.
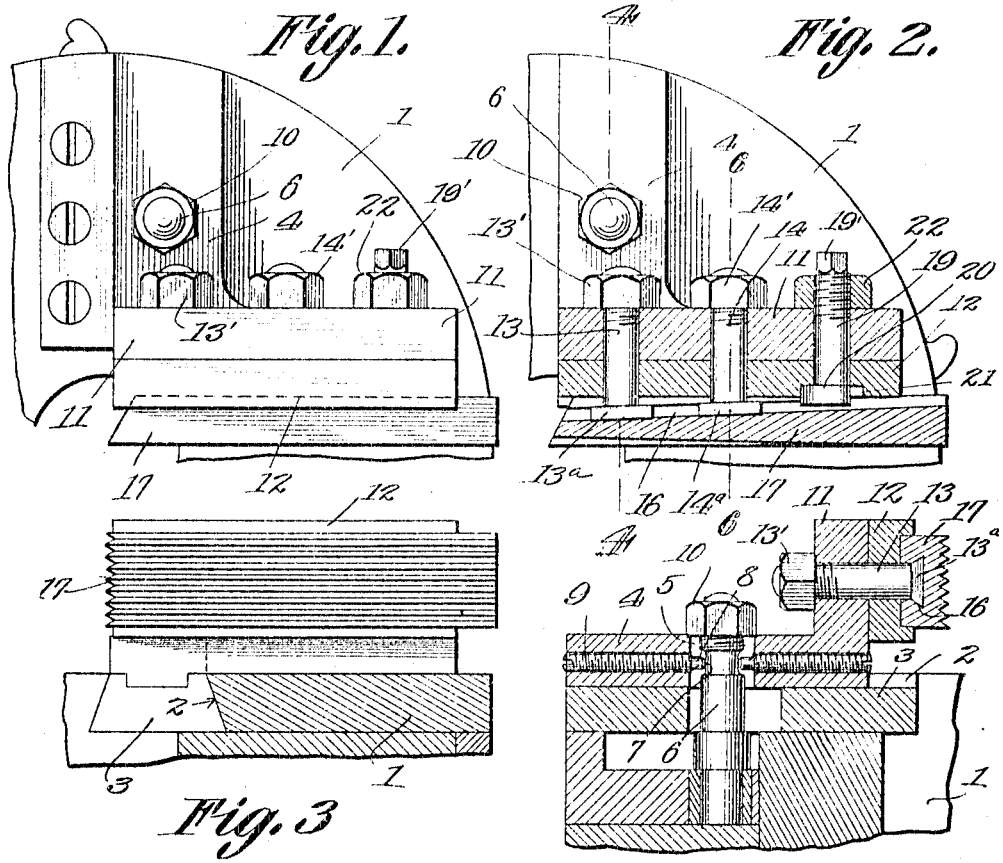
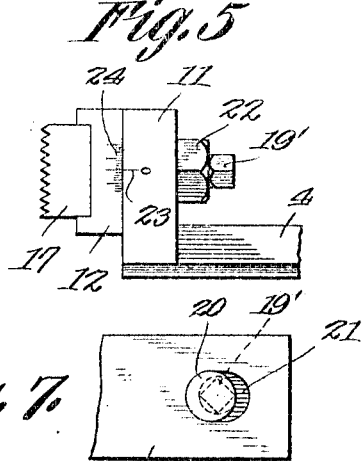
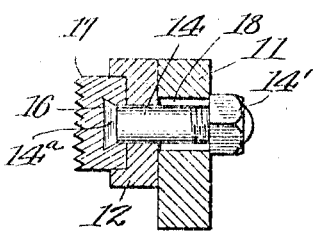
Victor R. Koontz
Inventor
by C.A. Snow & Co.
Attorneys
Witnesses

V. R. KOONTZ.
TOOL HOLDER.
APPLICATION FILED JAN. 4, 1913.
1,080,565.
Patented Dec. 9, 1913.
2 SHEETS—SHEET 2.
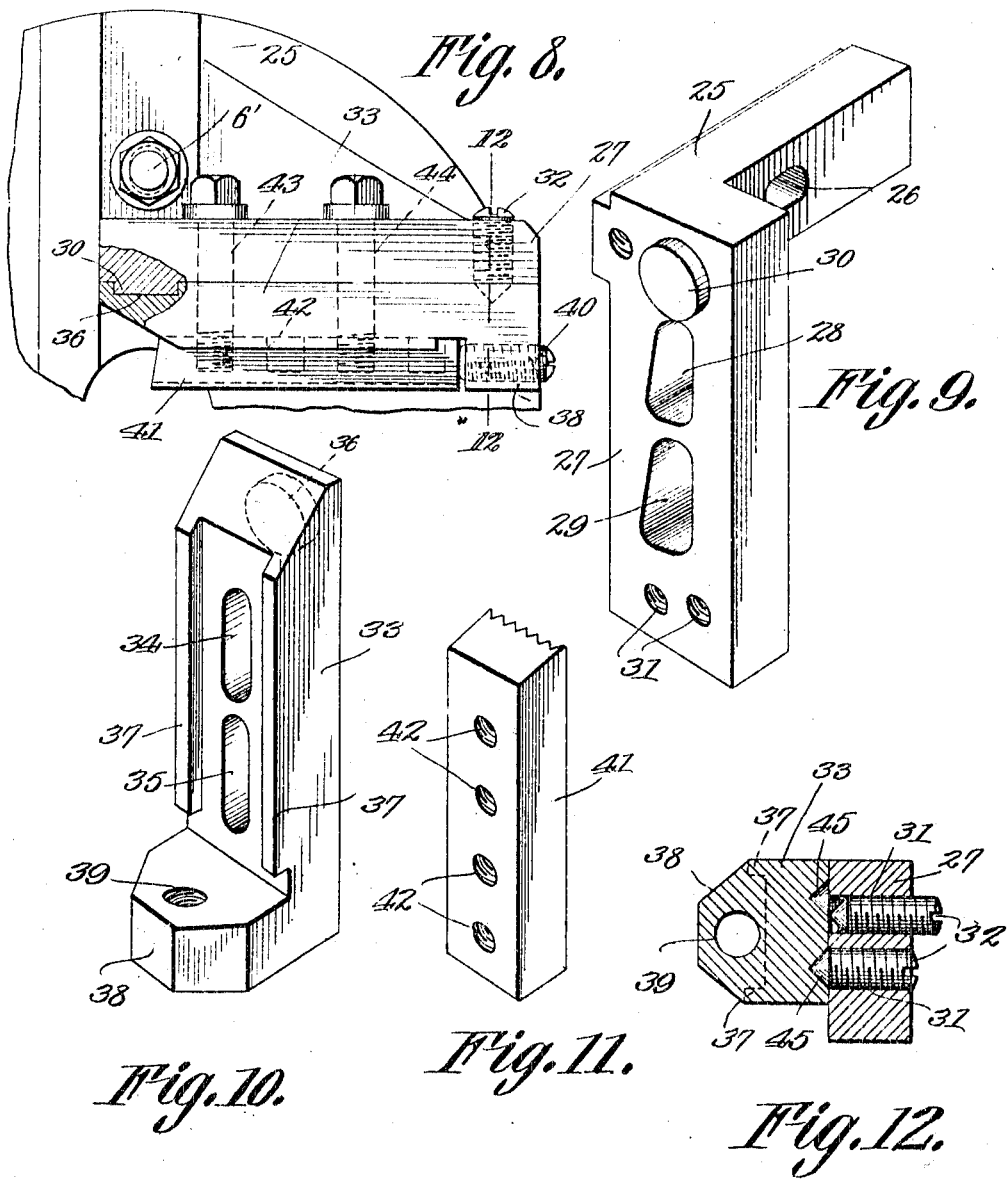
Witnesses
Victor R. Koontz, Inventor,
by C. A. Snow & Co.
Attorneys

UNITED STATES PATENT OFFICE.

VICTOR R. KOONTZ, OF WAYNESBORO, PENNSYLVANIA.

TOOL-HOLDER.

1,080,565.    Specification of Letters Patent.    Patented Dec. 9, 1913.

Application filed January 4, 1913. Serial No. 740,246.

*To all whom it may concern:*

Be it known that I, VICTOR R. KOONTZ, a citizen of the United States, residing at Waynesboro, in the county of Franklin and State of Pennsylvania, have invented a new and useful Tool-Holder, of which the following is a specification.

The present invention relates to improvements in tool holders for cutter heads, the primary object of this invention being the provision of a novel form of tool holder, in which the tool is so disposed as to be moved to and from work engaging position, and whereby the tool itself may be adjusted and locked in such desired adjusted position so as to present its cutting edge to the work in the best possible manner.

A further object of the present invention is the provision of a novel means carried by the tool holder for adjusting the angularity of the tool while in the tool holder so that the cutting edge thereof is properly presented.

A still further object of the present invention is the provision of means whereby the tool may be adjusted longitudinally and be properly clamped in work engaging position so that the tool may be used for a greater length of time than usual, the sharpening of the stock shortening the same but permitting its use in connection with the present form of tool holder.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a plan view of a portion of a cutter head with the present tool holder connected thereto. Fig. 2 is a similar view showing the tool and the adjacent portions shown in transverse section. Fig. 3 is a sectional view through the cutter head showing the grooved portion of the tool and the tool holder in elevation. Fig. 4 is a section taken on line 4—4 of Fig. 2. Fig. 5 is an end view showing the method of adjusting the tool with relation to the holder and the scale. Fig. 6 is a section taken on line 6—6 of Fig. 2. Fig. 7 is a plan view showing the means for adjusting the angularity of the tool. Fig. 8 is a view similar to Fig. 1 of a modified form of tool holder. Fig. 9 is a perspective view of the main portion thereof. Fig. 10 is a perspective view of the tool carrier of the holder. Fig. 11 is a perspective view of the tool. Fig. 12 is a section taken on line 12—12 of Fig. 8.

Referring to the drawings, and more particularly to Figs. 1 through 7, the numeral 1 designates the die holder head, of the form generally employed for forming screw threads upon bolts, the same being provided with the dove-tail slot 2 for the sliding reception of the dove-tail member 3 of the tool holder base 4. The base 4, as clearly shown in Fig. 4, is provided with the actuating bolt receiving aperture 5 for the reception of the bolt 6, whereby the base 4 has imparted thereto through the actuation of the cutter head, a slidable movement to and from the center of the die holder. The bolt 6 is recessed as at 7 for the reception of the reduced end 8 of the two oppositely disposed adjusting screws 9. The bolt 6 is properly locked in connection with the base 4 by means of the nut 10. Formed integral with and carried by the base 4 at right angles thereto is the upstanding plate 11 which constitutes the main support for the tool carrier 12, said tool carrier 12 being adjustably connected to the outer face of the plate 11 by means of the two bolts 13 and 14, provided with the respective heads 13ª and 14ª which are disposed within the longitudinal groove 16 of the thread forming tool 17, said tool 17 assuming the position relatively to the carrier 12, as clearly illustrated in Figs. 2, 4 and 6. The nuts 13′ and 14′ constitute a means for locking the respective bolts 13 and 14 relatively to the tool 17, the carrier 12 and the support 11, the bolt 13 constituting a pivot for the carrier 12 and the tool 17 so that the tool may be adjusted angularly to dispose its cutting edge at any desired angle to the work. In order to permit this, the bolt 14 is disposed as shown in Fig. 6, through the elongated aperture 18 of the support 11, said elongated aperture 18 being extended vertically to permit the rise and fall of the bolt 14, due to the adjustment of the adjusting bolt 19 whose eccentric head 20 is disposed within the recess 21 of the carrier 12. The outer end of the bolt 19 at 19' is shouldered to permit of the engagement therewith of a wrench so that the eccentric or cam 20 may be adjusted to elevate or lower the rear end of the carrier 12 and tool 17, to, as before stated, adjust the angular engagement of the cutting end of the tool relatively to the work. In order to lock the bolt 19 in the desired adjustment, the nut 22 is provided.

As clearly shown in Fig. 5, the scales 23 and 24 are carried by the respective plate 11 and carrier 12, so that the operator may elevate or lower the carrier 12 and tool 17 according to the desired angle, and may be notified at a glance the position of the tool. This portion is in reality a gage for adjusting the tool and carrier relatively to the work.

As clearly shown in Figs. 8 through 14, the base 25 of the tool holder is constructed somewhat similarly to the base 4 and is mounted to be actuated by the bolt 6', which is similar to the bolt 6 and is connected to the cutter head as is usual. The carrying plate 27 in this instance is provided with the two elongated apertures or slots 28—29, the circular abutment 30 and the two threaded parallel apertures 31. Disposed in these threaded apertures 31 are the two adjusting screws 32, which perform the same function, as will presently appear, as the bolt 19 and eccentric 20 of the structure heretofore described.

The tool carrier 33 as clearly shown in detail in Fig. 10, is provided with the two elongated slots 34 and 35, and with the circular socket 36, said slots being disposed to register with the slots 28 and 29 of the plate 27 while the socket 36 receives the cylindrical projection 30 so that the tool carrier may be swung with the projection 30 its axis. The carrier 33 is further provided with the two parallel ribs 37 which provide a receptacle for the longitudinal movement and adjustment of the tool 41, there being formed rigidly at one end at right angles to the carrier 33, the lug 38 which is provided with the threaded aperture 39 for the reception of the tail adjusting screw 40. Such screw is disposed to engage the end remote from the cutting end of the tool 41 to lock the same against longitudinal movement within the carrier 33, when the parts are in the assembled position as shown in Figs. 8 and 12. The locking bolts 43 and 44 are disposed to project through the respective slots 28—34 and 29—35 of the plate 37 and carrier 33 and have their reduced threaded ends thereof fit within two of the plurality of threaded sockets 42 formed within the body of the tool 41. By this means the tool is properly adjusted with relation to the carrier 33 and is held in locked position by means of the two bolts 43 and 44 after the same has been properly adjusted relatively to the work to be cut, by means of the screws 32 and the conical sockets 45 formed in the face of the tool carrier 33, as clearly illustrated in Fig. 12. It will thus be seen that the screws 32 and the sockets 45 provide a means for adjusting the carrier 33 relatively to its pivotal points 30—36 so as to present the cutting edge of the tool in the desired cutting position, such adjusting device as herein described being similar to the device including the bolt 19 and eccentric 20 in the form shown in Fig. 1 through 7.

By means of the elongated slots 28—34 and 29—35, the tool 41 may be adjusted longitudinally within the carrier 33 between the ribs 37, and after the angular adjusting devices 32—45 have been adjusted, the bolts 43—44 may be tightened to lock the tool and carrier 33 rigidly with relation to the supporting plate 47 of the holder. By reason of the fact that the tool is provided with a plurality of threaded sockets 42, it is evident that as the tool is sharpened or worn, that the same may be adjusted relatively so that the tool can be used with the least possible waste.

From the foregoing description, taken in connection with the drawings it is evident that with a tool holder constructed according to and embodying the present invention, that the tool itself is permitted to be adjusted longitudinally of the holder and to have the rear end thereof adjusted angularly so as to present the cutting edge at any desired angle to the work for producing tapered threads or cylindrical threads upon bolts as for machine and lag screws, and that by reason of the various clamping devices the tool is locked in the desired adjusting position.

What is claimed is:

1. A tool holder, including a supporting member, a tool carrier, coacting means carried by the tool carrier and supporting member for swingingly connecting the carrier to the supporting member, coacting means also carried by the supporting member and carrier for adjusting the angular relation of the tool carrier to the supporting member, a tool mounted in the carrier, and means projecting through the supporting member and carrier and engaging the tool to lock the tool in the carrier and the carrier to the supporting member.

2. A tool holder, including a supporting member, a tool carrier, coacting means carried by the tool carrier and supporting member for swingingly connecting the carrier to the supporting member, coacting means also carried by the supporting member and carrier for adjusting the angular relation of the tool carrier to the supporting member, a tool mounted for longitudinal movement in the carrier, means for limiting the longitudinal movement, and means piercing the supporting member and carrier and engaging the tool to lock the tool and carrier to the supporting member.

3. A tool holder, including a supporting plate, a circular projection carried upon one face thereof, a tool carrier having a circular socket in one end to fit upon the circular projection of the supporting plate, said circular projection and socket being the axis of the carrier, coöperative means carried by the opposite ends of the supporting plate and carrier for adjusting the carrier relatively to the supporting plate, a tool disposed in the carrier, and means piercing the supporting plate, carrier and engaging the tool to lock the parts together.

In testimony that I claim the foregoing as my own, I have hereto affixed my signature in the presence of two witnesses.

VICTOR R. KOONTZ.

Witnesses:
 EDUARD W. MATHIAS,
 CHAS. B. CLAYTON.